Feb. 26, 1952 H. SEAMAN 2,587,539
HYDRAULICALLY BALANCED VALVE SYSTEM
Filed Sept. 7, 1946 4 Sheets-Sheet 1

Inventor
Henry Seaman
Frederick G.R. Boyer
Attorney

Feb. 26, 1952          H. SEAMAN          2,587,539
HYDRAULICALLY BALANCED VALVE SYSTEM
Filed Sept. 7, 1946          4 Sheets-Sheet 2
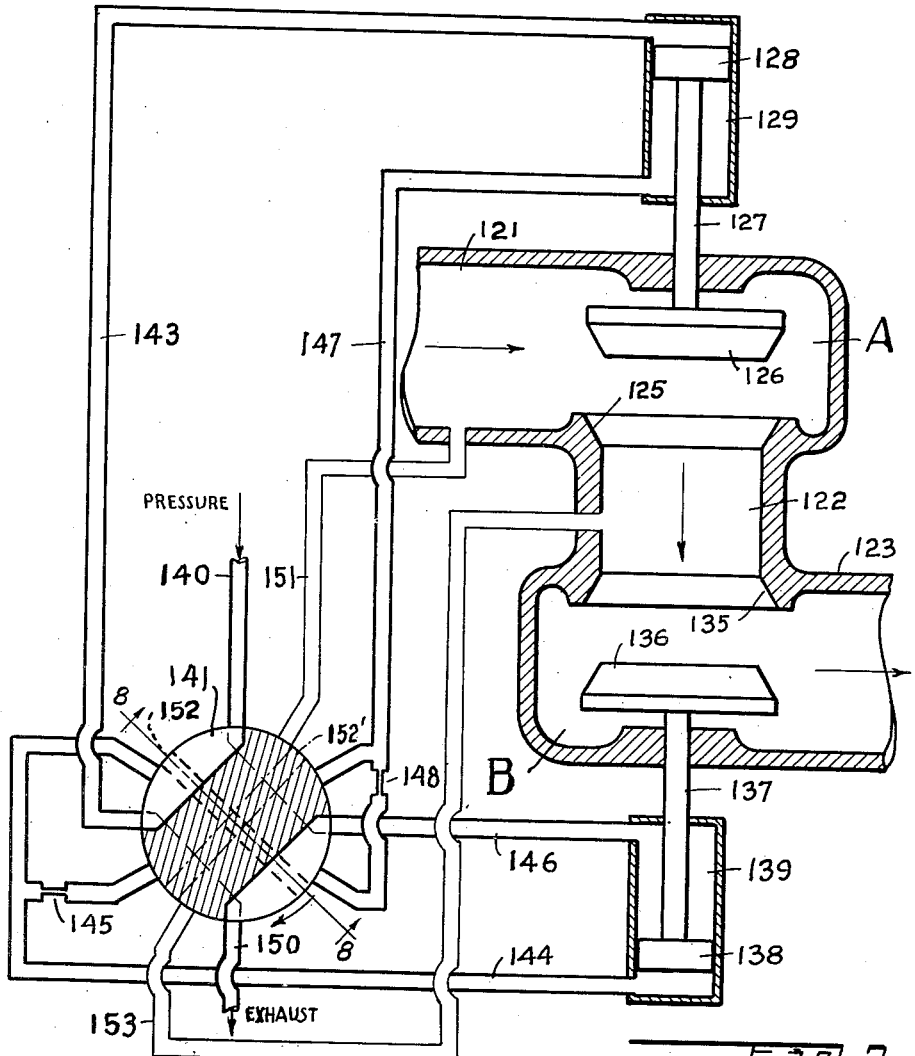
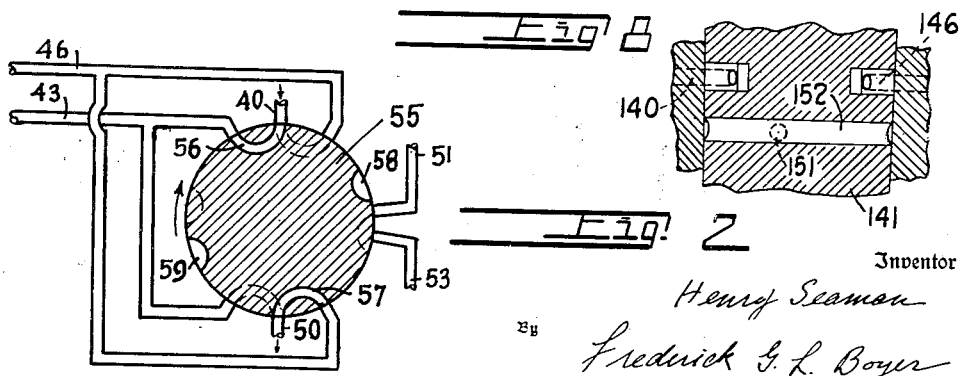
Inventor
Henry Seaman
Frederick G. L. Boyer
Attorney Inventor
Henry Seaman
By Frederick G. L. Boyer
Attorney

UNITED STATES PATENT OFFICE 2,587,539

HYDRAULICALLY BALANCED VALVE SYSTEM

Henry Seaman, Canton, N. C.

Application September 7, 1946, Serial No. 695,359

10 Claims. (Cl. 137—144)

This invention relates to valves and fluid control devices and has especial value in control of flow at high pressure and/or in pipes of large diameter. In such cases the total pressure on one side of the valve strongly resists either the opening or closing, or both, of valves of the usual types. In order to secure easier opening, so called balanced valves have been used in certain applications. These have not proven satisfactory for general application. It is difficult, for example, to seat both discs, used in the usual balanced valves, with equal tightness, and because of the parallel arrangement of the two parts of the valve a leak in either constitutes a leak in the valve.

The primary object of the present invention is to provide a valve which can be opened and closed with little effort, whether manual or by other source of power, even when used with high pressures or made in large diameters. A further object is to provide a valve wherein pressures on opposite sides of the valve disc can be substantially balanced at the time it must be moved by applied power against the flow of fluid therethrough. Another object is to provide a valve which can be seated tightly and held tight by the controlled pressure and can be unseated and opened without the necessity of overcoming the said pressure. A still further object is to provide novel and separate controls for the two elements of a balanced valve whereby the necessary condition of balance is maintained by differential operation of the two elements. Still another object is to provide a fluid control valve device which can be hydraulically operated by use of hydraulic pressures which are much lower than the controlled pressure and/or which operate in hydraulic cylinders much smaller than the diameter of the pressure retaining element of the valve. Yet another object is the provision of suitable hydraulic control mechanism for this purpose. Other objects and advantages of the present invention will be apparent from the following description.

I have found it possible to accomplish the aforesaid objects by using valves of the type wherein the movable element (hereinafter called "disc" or "plug"—which terms are herein used synonymously) moves perpendicularly to the seat, as in the well known globe, angle, and needle valves, as distinguished from gate, piston, and sliding valves and cocks, wherein the movable element moves parallel or nearly parallel to the seat. For the purposes of the present invention I install two such valves in series so that the pressure of the controlled fluid tends to open one and close the other. I further provide operative interconnections between these two valves whereby both the opening and the closing movement of that valve disc which seats with the pressure of the controlled fluid, take place somewhat in advance of the corresponding movement of the other valve disc, thus maintaining a substantial balance between the pressures above and below the valve disc which is moving in opposition to the flow of the controlled fluid.

The invention will be further described with reference to the accompanying drawing in which:

Figure 3 is a diagrammatic illustration of another embodiment of the present invention.

Figure 7 is a diagrammatic representation of still another embodiment wherein the valve device of the invention is arranged for manual operation.

Figure 8 is a fragmentary sectional view of the master control cock taken on line 8—8 of Figure 3, and showing the axial relationship of the openings therein.

Figure 1:
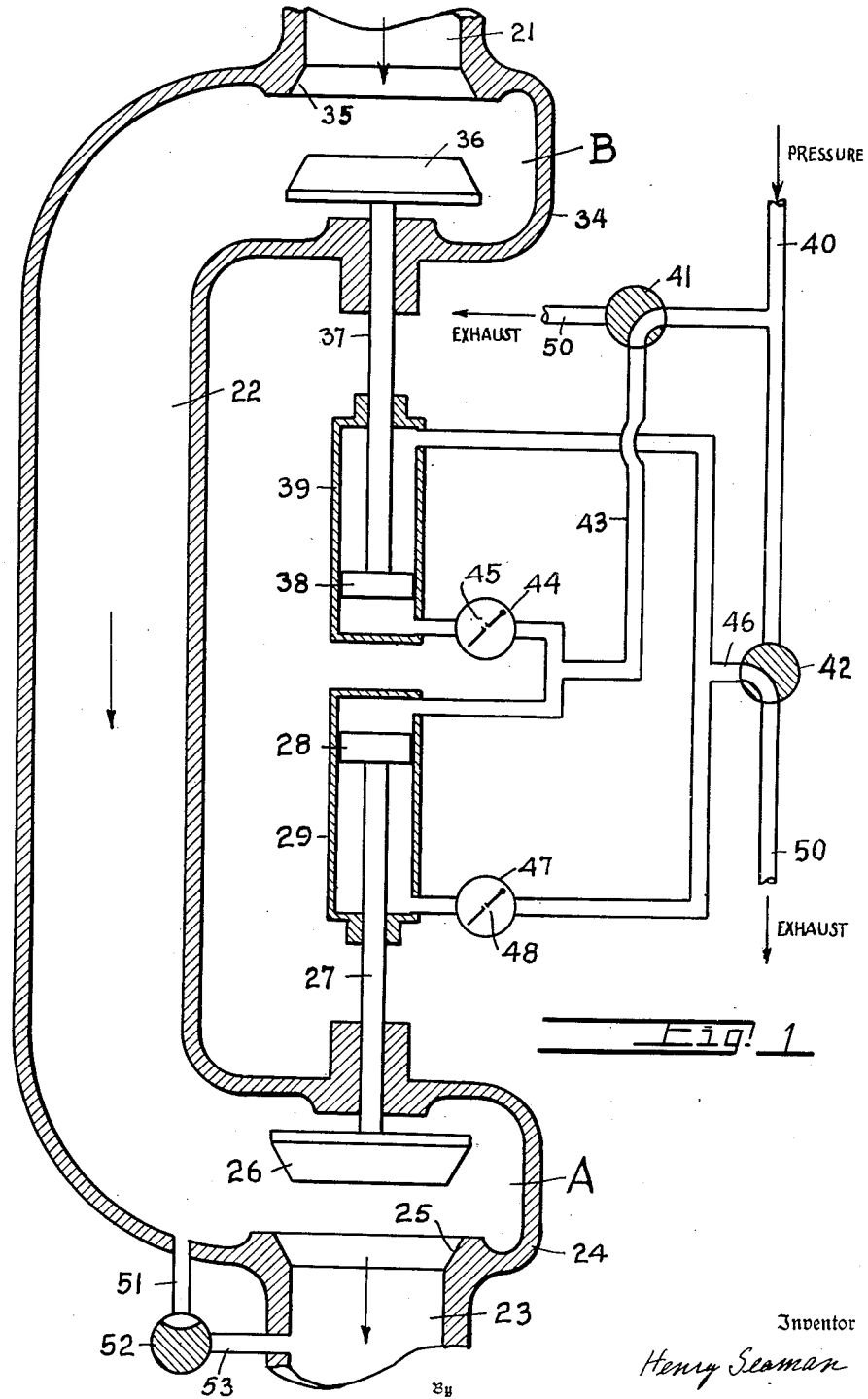
Figure 1 is a diagrammatic illustration of one embodiment of the present invention.

Referring first to the embodiment illustrated in Figure 1, a primary valve A and auxiliary valve B are connected in series. The controlled fluid enters valve B through pipe 21, is conducted through passage 22 (or multiple passages if desired) to primary valve A, and leaves the device through pipe 23. Valve A comprises a body 24, a stationary seat 25, and a movable disc 26 operated by sliding stem 27 attached to piston 28 in hydraulic cylinder 29. The corresponding parts of valve B are designated by numerals 34, 35, 36, 37, 38, and 39, respectively.

As is apparent from the drawing, the valves are so connected that the pressure of the controlled fluid aids the closing and resists the opening of valve A whereas it resists the closing and aids the opening of valve B.

Hydraulic fluid under pressure is supplied through a conduit 40 from any suitable source. Its flow is controlled by three-way cocks 41 and 42. A branched conduit 43 connects cock 41 to the spaces behind pistons 28 and 38 in cylinders 29 and 39 respectively. In the branch leading to cylinder 39 is a swing check valve 44 adapted to pass fluid freely into cylinder 39 but permit its escape only very slowly through an orifice 45. A branched conduit 46 connects cock 42 to the space before the pistons 28 and 38 in cylinders 29 and 39, respectively. In the branch leading to cylinder 29 is check valve 47 adapted to pass fluid freely into cylinder 29 but permit its escape only very slowly through an orifice 48. Cocks 41 and 42 are adapted to connect the conduits 43 and 46 either to pressure conduit 40 or exhaust designated generally by the numeral 50.

A by-pass 51, 53 including stop cock 52 leads from passage 22 to the pipe 23 around valve A or may lead to waste or other space where the pressure approximately equals that in pipe 23.

With the valve device (both valves A and B) open as illustrated in Figure 1, the operation of closing the valve will first be described. Cocks 41 and 42 are turned to the positions shown in the figure which admits hydraulic fluid freely behind both pistons and permits free exhaust from before piston 38 and exhaust at only a very restricted rate, through orifice 48, from before piston 28.

Valve A is thereby closed slowly, without shock or water-hammer in spite of the pressure of the controlled fluid on valve disc 26, due to the resistance imposed by orifice 48. The closing of valve B lags behind that of valve A by an amount which is greater as the hydraulic pressure applied through piston 38 is less, because of the balancing of this pressure against the pressure drop through valve B. When valve A is completely closed the pressure in passage 22 equals that in pipe 21 and valve disc 36 is seated firmly by the hydraulic pressure on piston 38.

Both valves A and B are now closed and cocks 41 and 42 may be left in the positions shown or turned to seal off conduits 43 and 46 so that hydraulic fluid can neither enter nor leave cylinders 29 and 39. Even though this should not keep valve B tightly closed, valve A will be held closed by the pressure of the controlled fluid and leakage cannot occur.

To open the valve device, three-way cock 42 is turned to connect conduit 46 to pressure line 40, thus freely admitting hydraulic fluid to cylinders 29 and 39, in front of pistons 28 and 38. At the same time three-way cock 41 is turned to connect conduit 43 to exhaust, which permits free exhaust from behind piston 28 and exhaust at only a very restricted rate, through orifice 45, from behind piston 38. Stop cock 52 is also opened thus equalizing the pressures above and below valve disc 26, which at that time is firmly seated on seat 25, this in spite of any leakage which may exist between valve seat 35 and disc 36. Because of the balanced pressures above and below valve disc 26 and the free admission of hydraulic fluid before, and its free exhaust from behind piston 28, valve A opens rapidly. At the same time valve B opens slowly, in spite of the pressure of fluid in pipe 21 on valve disc 36, due to the resistance imposed by orifice 45. This slow opening of valve B prevents pressure in passage 22 from building up to an extent which would interfere with the full and free opening of valve A. Both valves are then fully open, as shown in the figure. The by-pass, if connected to pipe 23 as illustrated, may remain open without harm, but since it is only required to be open during the unseating of valve disc 26, I prefer to close cock 52 during the early part of the valve opening operation. It then remains closed until just before the beginning of the next opening operation.

Three way cocks 41 and 42 and stop cock 52 have so far been described as independently operated. Since proper synchronization of their operation is necessary to successful operation of my valve device, I prefer to have them all operated as a unit. It will be noted that all three are illustrated in the position for closing the valve, and that turning each of them simultaneously through ninety degrees in a clockwise direction will accomplish opening of the valve, and that further turning through 270 degrees in the same direction will return them to their illustrated valve-closing positions without again opening the by-pass 51, 52, 53.

Figure 2:
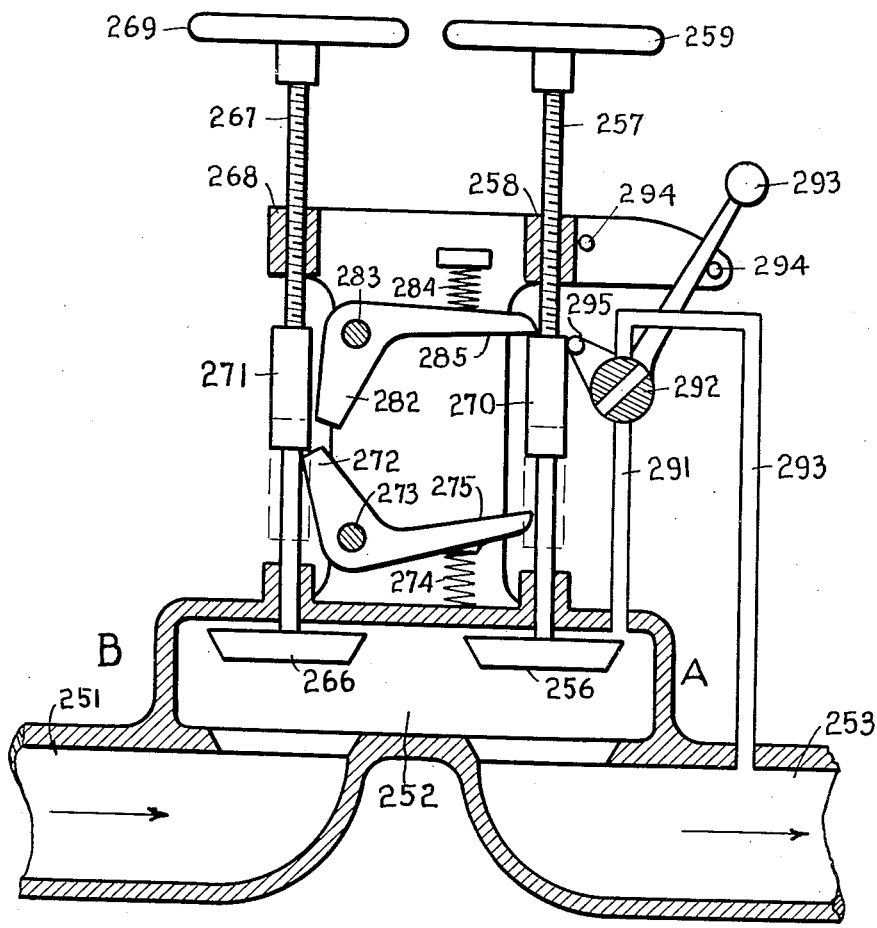
Figure 2 is a diagrammatic illustration of a special multi-way control cock to control the timing of the hydraulic operation of the valve.

The timed relationship between the operations of cocks 41, 42, and 52 can perhaps be better understood by reference to Figure 2 which shows how all may be replaced by a single multi-way cock 55. In the position illustrated hydraulic fluid passes from pressure conduit 40 through passage 56 in cock 55 into conduit 43 which delivers it behind the pistons in cylinders 29 and 39 to close the valves. Similarly pressure from before the pistons 28, 38 in cylinders 29, 39 is exhausted though conduit 46 and passage 57 in cock 55 into exhaust conduit 50. To open the valves, cock 55 is rotated in a clockwise direction bringing opening 58 to a position where it opens by-pass 51—53 just prior to the admission of pressure fluid from conduit 40 through passage 56 into conduit 46 and exhaust from conduit 43 through passage 57 into conduit 50, to open the valve. All three are open simultaneously for a brief interval to permit free unseating of valve disc 26, before cock 55 reaches the position indicated by broken lines, where by-pass 51—53 is again closed and passages 56 and 57 are in position to complete opening of the valves. Continued clockwise rotation of cock 55 brings it to a position diametrically opposite that shown in the figure and in all respect identical thereto—each half turn giving a full cycle of opening and closing the valve. It may be noted that passages 56 and 57 can pass the openings of by-pass conduits 51 and 53 without connecting them, and that openings 58 and 59 can pass the openings of conduits 40, 43, 46 and 50 without connecting them.

If it is desired to operate the valve in throttling position, the cocks 41, 42, 52 or the multi-way cock 55, can be turned to the position closing the conduits leading to and from each cylinder and holding the valve at any desired degree of opening. If it is desired to hold a set throttling opening for long periods of time, valve stems 27 and 37 can be mechanically held in place in any well known manner to prevent change of the valve adjustment in case of slow leakage of hydraulic fluid around the pistons or through stuffing boxes, or control cocks.

Figure 3 illustrates another embodiment of the invention, wherein the positions of primary and secondary valves A and B are the reverse of those illustrated in Figure 1. In this case the controlled fluid passes from pipe 121 through valve A, the passage 122, and valve B into pipe 123. Valve A comprises seat 125, disc 126, and stem 127, connected to piston 128 in cylinder 129. Similarly valve B comprises seat 135, disc 136, and stem 137 connected to piston 138 in cylinder 139. A by-pass 151, 152, 153 around valve A is also provided as in Figure 1.

In Figure 3 there is also illustrated a modified system of hydraulic connections and controls for operating the valves. It is to be understood, however, that the hydraulic connections illustrated in Figures 1 and 2 can be applied to the valve arrangement illustrated in Figure 3 and vice versa. In the system illustrated in this figure the orifice check valves are replaced by orifices permanently fixed in the discharge pipe lines as hereinafter fully explained.

Hydraulic fluid under pressure is, in Figure 3, supplied through conduit 140 controlled by a special cock 141. A conduit 143 connects the space behind piston 128 in cylinder 129 to cock 141. A conduit 144 connects the space behind piston 138 in cylinder 139 directly to one position on the periphery of cock 141 and through a permanent constriction or orifice 145 to another position on said periphery. Similarly a conduit 146 connects the space in front of piston 138 in cylinder 139 to cock 141. A conduit 147 connects the space in front of piston 128 in cylinder 129 directly to one position on the periphery of cock 141 and through a permanent constriction or orifice 148 to another position on said periphery.

With the apparatus as described, the operation is analogous to that described with reference to Figure 1. To close the valves cock 141 is turned to the position shown diagrammatically in Figure 3. This admits hydraulic fluid freely behind both pistons (orifice connection 145 being closed by cock 141), and permits free exhaust from before piston 138 in cylinder 139, and exhaust at only a very restricted rate, through orifice 148, from the space before piston 128 in cylinder 129 (free connection from conduit 147 to exhaust being closed by cock 141). Valve A is thereby closed slowly without shock or water-hammer, in spite of the pressure of the controlled fluid on valve disc 126, due to the resistance imposed by orifice 148. The closing of valve B lags behind that of valve A by an amount which is greater as the hydraulic pressure applied through piston 138 is less, because of the balancing of this pressure against the pressure drop through valve B. When valve A is completely closed valve B is not yet closed because of this lag. The pressure in passage 122 is then equal to that in pipe 123 and valve disc 136 is seated firmly by the hydraulic pressure on piston 138.

Both valves A and B are then closed and cock 141 may be left in the position shown or turned in a clockwise direction for about 45 degrees, closing off both the pressure and exhaust conduits and separately sealing off the pressures before and behind the pistons. Even though this should not keep valve B tightly closed, valve A will be held closed by the pressure of the controlled fluid and leakage cannot occur.

To open the valve, cock 141 is turned in a clockwise direction for about one fourth turn to the position indicated by broken lines in Figure 3. This admits hydraulic fluid freely in front of both pistons (orifice connection 148 being closed by cock 141) and permits free exhaust from behind piston 128 in cylinder 129, and exhaust at only a very restricted rate from behind piston 138 in cylinder 139 through orifice 145 (free connection from conduit 144 to exhaust being closed by cock 141).

As with the device shown in Figure 1, it is necessary to equalize the pressures on opposite sides of valve disc 126 to permit easy unseating thereof. This may be accomplished, as illustrated in Figure 3, by an opening 152 in the plug of cock 141. Opening 152 is indicated by dotted lines in Fig. 3, and is more clearly shown in Fig. 8, as axially removed and completely distinct from the openings connecting conduits 140, 143, 144, 145, 146, 147, 148 and 150. When cock 141 approaches the valve-opening position indicated by broken lines in Figure 3 the opening 152 passes the openings into conduits 151 and 153 temporarily completing the by-pass around valve disc 126 and equalizing the pressure on opposite sides thereof. As in the embodiment illustrated in Figures 1 and 2, this by-pass remains open until the cock 141 has opened conduit 147 to pressure and 143 to exhaust, thus unseating valve 126 before the by-pass is closed by turning cock 141 to the position indicated by broken lines and bringing opening 152 to the position shown in the figure by dot-and-dash lines designated 152'. Because of the balanced pressures above and below valve disc 126 and the free admission of hydraulic fluid in front of, and its free exhaust from behind piston 128, valve A opens rapidly. At the same time valve B opens slowly, in spite of the pressure of fluid in passage 122 on valve disc 136, due to the resistance imposed by orifice 145. This retarded opening of valve B maintains in passage 122 sufficient pressure to nearly balance the pressure above valve disc 126 and thus permit the full and free opening of valve A.

Both valve A and B are then fully open as shown in the figure. By-pass 151—152—153 is closed, though, when connected directly from pipe 121 to passage 122 as shown, the opening 152 through cock 141 may be located to leave the by-pass open so long as cock 141 remains in the valve-opening position, and to close it as soon as the cock is turned to the valve-holding or valve-closing position.

Instead of the single, three-way or multi-way cocks, other types of valves can be used if desired and correct timing secured by interlocks or cam operation as will be well understood by those skilled in the art.

While I prefer the hydraulic operation of my improved duplex valve device, it is possible to secure many advantages of the present invention while using electric, mechanical, or even manual operation.

Figure 4:
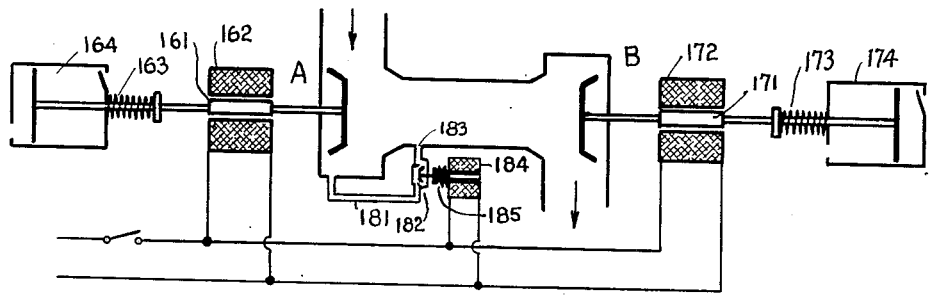
Figure 4 is a diagrammatic representation of a third embodiment of the present invention wherein the valves are solenoid operated.

Solenoid operation is possible on valves that are not too large. Such operation is illustrated in Figure 4 wherein valves A and B are illustrated in a purely diagrammatic manner and arranged exactly as in Figure 3. Valve A is pulled open by core 161 of solenoid 162 against the action of spring 163, which serves to close valve A when the solenoid 162 is de-energized. The opening action is unimpeded but the closing action is retarded to the desired degree by one way dash pot 164 the piston of which moves freely to the left but meets the resistance of entrapped fluid in moving to the right. Valve B is similarly opened by core 171 in solenoid 172 against the action of spring 173. Opening of valve B is retarded by one way dash pot 174, the piston of which moves freely to the left but meets the resistance of entrapped fluid in moving to the right, while the closing action of the valve is unimpeded. By-pass 181, 182, 183 is similar to that described with reference to Figure 3 but is operated by solenoid 184 and spring 185. Solenoids 162, 172 and 184 are connected in parallel so that all are energized and de-energized simultaneously. The action of the valve is clearly identical with that already described except that by-pass 181, 182, 183 is open so long as the valves are open. This is not significant but could be changed in a known manner if desired. With the arrangement shown the valve is open so long as the solenoids are energized and closed while they are de-energized.

Figure 5:
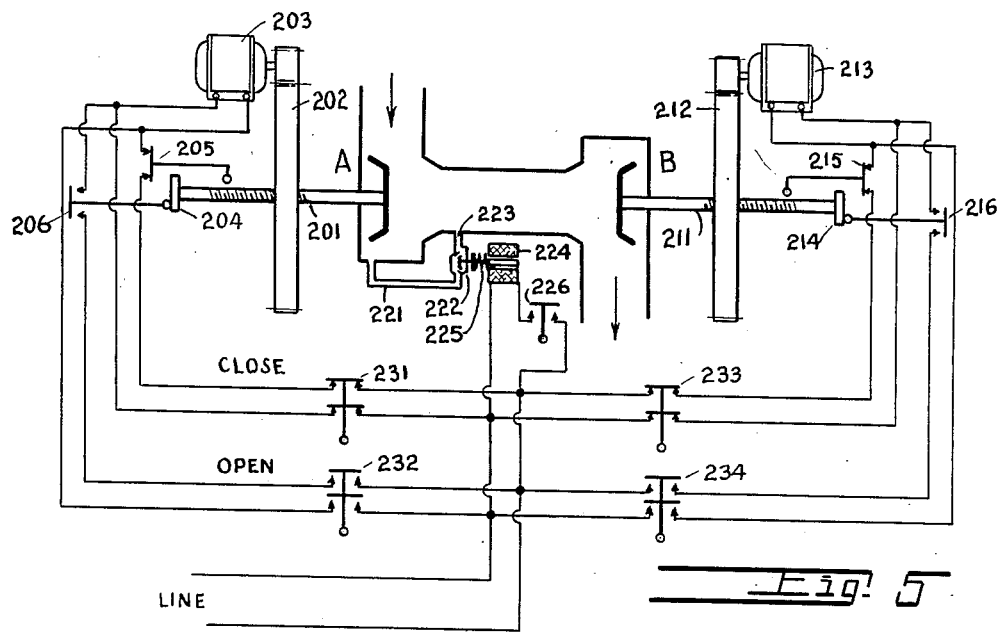
Figure 5 is a diagrammatic representation of a fourth embodiment showing electric motor operation of the valve.
Figure 6:
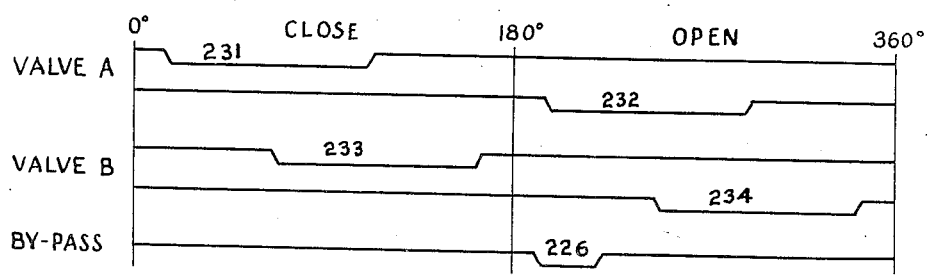
Figure 6 is a timing diagram showing the timed operation of the switches in the embodiment illustrated in Figure 5.

Alternative electric motor operation is illustrated in Figs. 5 and 6. In this modification valve A is operated by screw 201, through gearing 202, by motor 203. A collar 204 on screw 201 operates to open limit switches 205 and 206 to stop further operation of motor 203 when the valve has reached the limit of its motion. Similarly valve B is operated by screw 211, through gearing 212, by motor 213, and a collar 214 on screw 211 operates limit switches 215 and 216. By-pass 221, 223, being small, is preferably opened through valve 222 by solenoid 224 and closed by spring 225. The operation of the by-pass valve is controlled by a switch 226 as hereinafter described. Operation of the motors may be initiated by any suitable switching device such as a drum switch, or cam operated switches, such as are indicated diagrammatically at 231, 232, 233, and 234. The cam or drum which controls the timing of the operations is illustrated diagrammatically in Figure 6. The first 180 deg. of rotation control the closing and the second 180 deg. control the opening of the valve. The lines in the figure are numbered to indicate the switch controlled thereby. The higher portions of each line indicate the time the switch is open and the lower portion the time when the switch is closed. It will be apparent from the figure that if the cam or drum be rotated at a uniform and suitably slow rate for 180 deg. at a time, always in the same direction, the operation of the valve device will be the same as previously described. The speed of rotation should be such that the movement of each of the valves is completed before the switch initiating the operation is again opened. Rotation of the drum switch is advantageously accomplished by a small electric motor which can be started by a push button and stopped by completion of 180 deg. movement of the drum. By this means the valve device can be completely operated in opposite directions successively by a single push button, a single pressure on the button for each operation.

With the described timing of the valve operation, the only movement which must take place under seriously unbalanced pressure is movement in the direction of fluid flow. Movement of the valve disc, even in this direction requires unduly great moving force with the usual screw stems. I accordingly prefer to provide screw stems having thread angles almost large enough for the pressure on the disc to cause rotation of the screw, using double or higher multiple threads as necessary for this purpose. The fluid flow then assists movement in this direction while the balanced pressures permit free movement in the other direction. The power required to operate this valve is accordingly very small in spite of high pressures or large valve openings.

It is also possible to adapt my duplex valve to manual operation by using suitable interlocks to insure proper timing of the operations. One arrangement of parts for this purpose is diagrammatically illustrated in Figure 7. In the specific embodiment of my invention illustrated to show the application of manual operating devices, the controlled fluid enters through pipe 251, passes through valve B, passage 252, and valve A, and leaves through pipe 253. Movable disc 256 of valve A is operated by threaded stem 257 which is turned in threaded nut 258, fixed to the valve structure, by means of hand wheel 259. The corresponding parts of valve B are designated by numerals 266, 267, 268, and 269 respectively.

For the purpose of controlling the sequence of operation of valves A and B, the valve stems are provided with portions 270 and 271, respectively, of enlarged diameter. To prevent attempted closing of valve B before the required closing of valve A, if the fluid pressure itself is not adequate, a detent 272 pivoted at 273 to the valve structure can be provided. As shown it is adapted to be held by a spring 274 under enlargement 271 on stem 267 and prevent any closing of valve B. When valve A is closed sufficiently, enlargement 270 on the stem 257 of valve A contacts arm 275 on detent 272 and rocks it out of the path of enlargement 271 and thereby permits closing of valve B by turning hand wheel 269.

To prevent premature opening of valve B and admission of the line pressure into passage 252, which would impose almost if not quite prohibitive resistance to the opening of valve A, a detent 282 is provided. This is mounted to rock on fixed pivot 283 and is normally held, by spring 284, in the path of enlargement 271 on stem 267 of valve B when this valve is closed. Valve B being closed, valve A can be opened readily because of the balanced pressures above and below disc 256. When valve A reaches the desired opening, as illustrated in the drawing, contact of enlargement 270 on valve stem 257, with arm 285 on detent 282 has rocked the detent to the position shown in the drawing, out of the path of enlargement 271 on valve stem 267, to permit opening of valve B, which opening is facilitated by the pressure of the controlled fluid below disc 266.

By-pass 291, 292, 293 around disc 256 of valve A, is provided as and for the purposes hereinbefore described. Cock 292 which controls the transmission of pressure through the by-pass can be operated, by handle 293, movement of which is limited by fixed stops 294. The fluid pressure itself is adequate to require opening of the by-pass (unless such opening is unnecessary) before opening of valve A. It is necessary, however, to be certain that cock 292 is closed at least by the time valve A is again fully closed. This can conveniently be accomplished by the final portion of the opening action, since there is no need for the by-pass to be open after the valve A has been even partially opened. For this purpose arm 295 may be provided on the movable plug of cock 292. As valve A is opened, enlargement 270 on stem 257 contacts arm 295 and rocks cock 292 to the closed position, where it remains until it is again opened preparatory to the next opening of the valve.

For satisfactory manual operation the thread angle must also be large, for the reasons set forth in connection with the description of electric operation.

It will be evident that the operation of this embodiment of the invention is essentially the same, except for the motive power employed, as the operation of the other embodiments described.

The mechanism illustrated in the drawings is all shown diagrammatically. No attempt has been made to show actual more or less conventional details of construction such as packing boxes, screwed and flanged joints, etc., since these can be readily supplied by those skilled in the art after the principles of the present invention are understood.

The present invention has been illustrated in various embodiments and with various operating media. However, all involve the duplex principle with two valve elements closing in opposite directions relative to the direction of flow of the controlled fluid, and the control of the operation of the element which moves in the direction of fluid flow together with a by-pass valve to maintain substantially balanced pressure on the other element so that it can operate freely. Various other changes can be made by those skilled in the art without departing from the invention as described and claimed. As will be understood by those skilled in the art, each of the various embodiments and operating media is better adapted to certain sizes of valve and certain types of service, and selection will be made accordingly.

From the foregoing description it is apparent that the flow of fluids, even in large conduits and/or under high pressures which would render extremely difficult the operation of conventional valves, can be controlled by use of the present invention by the use of very little physical effort or external power. Hydraulic operation is possible by use of hydraulic pressures much lower than the pressure of the controlled fluid, and/or hydraulic cylinders much smaller in diameter than the valve operated thereby.

I claim:

1. In combination: a primary fluid control valve comprising a stationary seat and a disc movable perpendicularly thereto so that pressure of the controlled fluid aids seating and resists unseating of said disc; an auxiliary valve similar to and in series with said primary valve but seating in the reverse direction so that pressure of the controlled fluid resists seating and aids unseating of the disc: means for opening and closing both of said valves; and means for reducing the force required for opening said primary valve, which comprises means for equalizing the pressure on opposite sides of said primary valve disc before said primary valve is to be opened; and means for maintaining nearly balanced pressure on opposite sides of said primary valve disc during opening thereof, said balanced pressure maintaining means comprising unidirectional retarding means for preventing the degree of opening of said auxiliary valve from exceeding that of said primary valve at any time throughout the opening operation.

2. In combination: a fluid control valve comprising a stationary seat and a disc movable perpendicularly thereto so that pressure of the controlled fluid aids seating and resists unseating of said disc; an auxiliary valve similar to and in series with said first named valve but seating in the reverse direction so that pressure of the controlled fluid resists seating and aids unseating of the auxiliary valve disc; a hydraulic cylinder and piston operatively connected to said first named valve disc; a hydraulic cylinder and piston operatively connected to said auxiliary valve disc; inlet means for admitting hydraulic fluid freely to each side of each piston; outlet means for freely releasing hydraulic fluid from that side of each piston which permits movement of the corresponding valve disc in a direction opposite to the flow of the controlled fluid; and outlet means of much smaller capacity for releasing hydraulic fluid at a restricted rate from that side of each piston which permits movement of the corresponding disc in the direction of flow of the controlled fluid.

3. In combination: a fluid control valve comprising a stationary seat and a disc movable perpendicularly thereto so that pressure of the controlled fluid aids seating and resists unseating of said disc; an auxiliary valve similar to and in series with said first named valve but seating in the reverse direction so that pressure of the controlled fluid resists seating and aids unseating of the auxiliary valve disc; a hydraulic cylinder and piston operatively connected to said first named valve disc; a hydraulic cylinder and piston operatively connected to said auxiliary valve disc; inlet means for admitting hydraulic fluid freely to each side of each piston; outlet means for freely releasing hydraulic fluid from that side of each piston which permits movement of the corresponding valve disc in a direction opposite to the flow of the controlled fluid; means of much smaller capacity for releasing hydraulic fluid at a restricted rate from that side of each piston which permits movement of the corresponding disc in the direction of flow of the controlled fluid; and means for controlling admission and release of hydraulic fluid to and from both cylinders in such relation to the pistons that both valves are simultaneously urged in the direction to open or close both valves, as desired.

4. A balanced valve structure comprising, a primary valve and an auxiliary valve, connected in series, each comprising a stationary seat and a movable disc so arranged that to close both valves the discs are moved in opposite directions, relative to the direction of fluid flow therethrough, the primary valve disc moving in the direction of said fluid flow and the auxiliary valve disc moving counter thereto; means for moving both discs to open or close both valves; unidirectional retarding means separately associated with each of said valve discs, each operative to retard the motion of the associated disc only in the direction of flow through the valve.

5. A balanced valve structure comprising, a primary valve and an auxiliary valve, connected in series, each comprising a stationary seat and a movable disc so arranged that to close both valves the discs are moved in opposite directions, relative to the direction of fluid flow therethrough, the primary valve disc moving in the direction of said fluid flow and the auxiliary valve disc moving counter thereto; means for moving both discs to open or close both valves; retarding means operative during the closing action for preventing excessively rapid closing of said primary valve; means for equalizing the pressure on opposite sides of said primary valve disc before starting to open either of said valves; and means operative during the opening action for retarding the opening of the auxiliary valve to prevent a substantial unbalance between the fluid pressures on opposite sides of said primary valve disc such as would interfere with the free opening thereof.

6. A balanced valve structure comprising, a primary valve and an auxiliary valve, connected in series, each comprising a stationary seat and a movable disc so arranged that to close both valves the discs are moved in opposite directions relative to the direction of fluid flow therethrough; a hydraulic cylinder and piston operatively connected with each of said valves for controlling the flow of fluid therethrough, the primary valve disc moving in the direction of said fluid flow and the auxiliary valve disc moving counter thereto; a by-pass connecting the space between said valves with a space wherein the pressure approximates that on the other side of said primary valve disc; valve means in said by-pass for controlling the transmission of pressure therethrough; valve means for controlling admission of pressure fluid to, and escape of pressure fluid from, each side of both of said hydraulic cylinders; interconnections between said valve means for controlling the sequence of the operations thereof, to open said by-pass preliminarily to the admission of pressure fluid into said hydraulic cylinders to open said primary and auxiliary valves, and to close said by-pass preliminarily to admission of pressure fluid into said hydraulic cylinders to close said primary and auxiliary valves.

7. In combination: a primary fluid control valve comprising a stationary seat and a disc movable perpendicularly thereto so that pressure of the controlled fluid aids in seating and resists unseating of said disc; an auxiliary valve similar to and in series with said first named valve but seating in reverse direction so that pressure of the controlled fluid resists seating and aids unseating of the disc of the auxiliary valve; a hydraulic cylinder and piston operatively connected to said primary valve disc; a hydraulic cylinder and piston operatively connected to said auxiliary valve disc; a fluid by-pass connecting the space between said valve discs with a space wherein the pressure approximates the pressure on the other side of the primary valve disc; means for admitting hydraulic fluid to and releasing it from each side of the piston in each of said hydraulic cylinders; a constriction through which hydraulic fluid must flow in escaping from that side of each of said pistons towards which said piston is urged by the fluid pressure on the connected valve disc; valve means for controlling the admission of hydraulic fluid to and its escape from said cylinders, and for controlling the transmission of pressure through said by-pass, said valve means being operable to maintain said by-pass closed while simultaneously freely admitting hydraulic fluid to both of said cylinders for closing both said primary valve and said auxiliary valve, and permitting free escape of hydraulic fluid from the other side of the piston which is closing said auxiliary valve and only restricted escape, through one of said constrictions, of hydraulic fluid from the other side of the piston which is closing said primary valve, said valve means being further operable to open said by-pass, and to simultaneously freely admit hydraulic fluid to both of said cylinders for opening both said primary valve and said auxiliary valve while permitting free escape of hydraulic fluid from the other side of the piston which is opening said primary valve and only restricted escape, through one of said constrictions, of hydraulic fluid from the other side of the piston which is opening said auxiliary valve, and, after admission of fluid to said cylinders, to again close said by-pass.

8. In combination: a primary fluid control valve comprising a stationary seat and a disc movable perpendicularly thereto so that pressure of the controlled fluid aids seating and resists unseating of said disc; an auxiliary valve similar to and in series with said first named valve but seating in reverse direction so that pressure of the controlled fluid resists seating and aids unseating of the disc of the auxiliary valve; means for closing said primary valve slowly to avoid shock; means for closing said auxiliary valve following slightly behind the closing of said primary valve; means for equalizing the pressure on opposite sides of said primary valve prior to opening said valve; means for opening said primary valve; and means for opening said auxiliary valve following somewhat behind the opening of said primary valve, whereby the pressures on opposite sides of said primary valve disc are maintained substantially balanced during the opening thereof.

9. Method of operating a valve which closes with and opens against the controlled pressure by use of forces much less than those due to pressure of the controlled fluid, which comprises: closing the fluid passage near the valve before the valve is to be opened; substantially equalizing the pressure between the valve and said closure with that on the other side of said valve; opening said valve; reopening the fluid passage near the valve in such a manner as to cause said reopening action to lag behind the opening of the valve to an extent to maintain a near balance between the pressures above and below said valve.

10. Method of operating a valve which closes with and opens against the controlled pressure by use of forces much less than those due to pressure of the controlled fluid, which comprises: closing the valve; constraining the closing action to take place slowly; closing the fluid passage near said valve in such a manner as to cause said closing action to lag behind the closing of the valve to such a degree that at least the major portion of the pressure drop caused by cutting off the fluid flow takes place at the valve itself; then, prior to opening the valve, substantially balancing the pressure on opposite sides of the valve; opening the valve; opening the closure made near the valve in such a manner as to cause said opening action to lag behind the opening of the valve so that not more than a minor portion of the total pressure drop due to restricted flow, takes place at the valve during opening thereof.

HENRY SEAMAN.

REFERENCES CITED

The following references are of record in the file of this patent:

UNITED STATES PATENTS

| Number | Name | Date |
|---|---|---|
| 1,169,401 | Hodgson | Jan. 25, 1916 |
| 1,290,722 | Doble | Jan. 7, 1919 |
| 1,394,332 | Myer | Oct. 18, 1921 |
| 1,838,723 | Welcker | Dec. 29, 1931 |
| 1,861,742 | Hand | June 7, 1932 |
| 2,085,893 | Boland | July 6, 1937 |

FOREIGN PATENTS

| Number | Country | Date |
|---|---|---|
| 363,897 | Italy | Oct. 17, 1938 |